United States Patent Office 3,334,088
Patented Aug. 1, 1967

3,334,088
N-(2-ALKENYL)-AZABICYCLOOCTANES AND NONANES
Robert B. Moffett, Kalamazoo, Mich., assignor to The Upjohn Company, Kalamazoo, Mich., a corporation of Delaware
No Drawing. Filed July 28, 1966, Ser. No. 568,402
3 Claims. (Cl. 260—239)

This invention relates to new and useful chemical compounds and to a process for their production. More particularly this invention relates to 2-(2-alkenyl)-2-azabicyclo[2.2.2]octanes and 3 - (2 - alkenyl) - 3 - azabicyclo [3.2.2]nonanes and to the process for the production thereof.

The novel compounds of this invention are represented by the following structural formula:

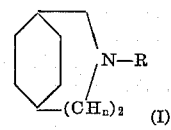

wherein $n$ is 0 or 1 and R is a lower 2-alkenyl radical of 3 to 5 carbon atoms, inclusive, such as allyl, 2-butenyl (crotyl), 2-methylallyl (methallyl), 3-methyl-2-butenyl, 2-pentenyl and the like.

The term "novel compounds of the invention" as used throughout the specification embraces the compounds of Formula I and the acid addition salts thereof. Said acid addition salts comprise the salts of the above free bases of Formula I with pharmacologically acceptable acids such as sulfuric, hydrochloric, hydrobromic, nitric, phosphoric, lactic, benzoic, methanesulfonic, p-toluenesulfonic, salicylic, acetic, propionic, maleic, malic, tartaric, citric, cyclohexanesulfamic, succinic nicotinic, ascorbic acids, and the like. These acid addition salts are useful for upgrading and purifying the free bases.

The novel compounds of this invention are diuretic, pseudocholinesterase inhibiting, anti-bacterial and cholesterol lowering agents. They are also useful as coccidiostats and have anorexigenic activity.

For purposes of administration to birds and to mammals, including animals of economic value, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The compounds of the Formula I form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The novel free bases of Formula I are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds. The free bases are also useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel compounds of this invention are prepared by reacting 2-azabicyclo[2.2.2]octane [Schneider et al., Chem. Ber. 96, 2377 (1936)] or 3-azabicyclo[3.2.2]nonane (Belgian Patent 608,905) with the appropriate lower 2-alkenyl halide, to obtain the corresponding 2-(2-alkenyl)-2-azabicyclo[2.2.2]octane (I) and the corresponding 3-(2-alkenyl)-3-azabicyclo[3.2.2]nonane (I), respectively. The reaction is preferably carried out in the presence of an inert solvent, for example benzene, toluene, xylene, diethyl ether, diisopropyl ether, and the like. The reaction can be carried out at temperatures within the range of about 0° C. to about 150° C. Temperatures within the range of about 20° C. to about 100° C. are particularly advantageous. Lower 2-alkenyl halides which are used to obtain the novel compounds of Formula I are those which contain from 3 to 5 carbon atoms, inclusive, such as allyl bromide, allyl chloride, 2-butenyl bromide, 2-methylallyl chloride, 3-methyl-2-butenyl bromide, 2-pentenyl bromide and the like.

The compounds of Formula I are recovered from the reaction mixture by conventional methods. A convenient method is to add acetic anhydride to the reaction mixture to form the N-acetyl derivative of any unreacted amino starting material present. The reaction mixture is then diluted with water and acidified, and the aqueous and organic layers are separated. Any N-acetyl derivative present in the aqueous layer is removed by extraction with a suitable water immiscible organic solvent, such as ether, benzene, toluene, methylene chloride and the like. The acid aqueous solution, after extraction, is then made basic with a suitable inorganic base such as sodium or potassium hydroxide and the basic mixture is extracted with an immiscible organic solvent, for example, those named above. The solvent extract is washed with water, dried over a drying agent, such as sodium sulfate, potassium carbonate and the like. The solvent is then removed by evaporation or distillation and the residue thus obtained is purified by conventional methods, for example, by distillation under reduced pressure.

The acid addition salts of the compounds of Formula I are prepared by methods well known in the art. For example, the acid addition salts of the invention can be prepared by reacting the free base with a pharmacologically acceptable acid as hereinbefore defined, in the presence of an inert solvent such as water, ether, and lower alkanols such as methanol, ethanol, and the like.

The following examples are illustrative of the products and process of the present invention, but they are not to be construed as limiting.

Example 1.—3-allyl-3-azabicyclo[3.2.2]nonane

A solution of 61.7 g. (0.51 mole) of allyl bromide in about 100 ml. of benzene was added to a solution of 62.5 g. (0.5 mole) of 3-azabicyclo[3.2.2]nonane in about 200 ml. of benzene over a period of about 15 minutes. The reaction mixture was refluxed for about one hour, cooled and 51 g. of acetic anhydride was added. The mixture was stirred under reflux for 2 hrs., cooled and poured into ice water, and acidified with acetic acid. The layers were separated and the aqueous layer was extracted with ether. The combined ether and benzene solutions were washed with water, dried over anhydrous sodium sulfate, filtered and evaporated to dryness. The residue was dissolved in hexane, filtered and evaporated to dryness, giving 34.4 g. of 3-acetyl-3-azabicyclo[3.2.2]nonane which was recrystallized from 70 ml. of hexane, giving 9.7 g., M.P. 86.5–89° C.

The acidic aqueous solutions were combined, basified with sodium hydroxide and extracted with ether. The ether solutions were washed with water and dried over anhydrous sodium sulfate. Filtration and removal of the solvent gave 52.9 g. of oil which was distilled through a packed (helices) column, giving 43.6 g. (53% yield) of 3-allyl-3-azabicyclo[3.2.2]nonane, B.P. 97° C. (13 mm.); $n_D^{25}$ 1.4948.

*Analysis.*—Calcd. for $C_{11}H_{19}N$: C, 79.94; H, 11.59; N, 8.48. Found: C, 80.68; H, 12.04; N, 8.33.

Following the procedure of Example 1, but substituting other 2-alkenyl halides in place of allyl bromide, such as 2-butenyl bromide,
2-methylallyl chloride,
3-methyl-2-butenyl bromide, and
2-pentenyl bromide, there can be respectively obtained:

3-(2-butenyl)-3-azabicyclo[3.2.2]nonane,
3-(2-methylallyl)-3-azabicyclo[3.2.2]nonane,
3-(3-methyl-2-butenyl)-3-azabicyclo[3.2.2]nonane, and
3-(2-pentenyl)-3-azabicyclo[3.2.2]nonane.

In the same manner following the procedure of Example 1, but substituting 2-azabicyclo[2.2.2]octane as starting material in place of the 3-azabicyclo[3.2.2]nonane and using allyl bromide or other 2-alkenyl halides such as those listed hereinabove, there can be respectively obtained:

2-allyl-2-azabicyclo[2.2.2]octane,
2-(2-butenyl)-2-azabicyclo[2.2.2]octane,
2-(2-methylallyl)-2-azabicyclo[2.2.2]octane,
2-(3-methyl-2-butenyl)-2-azabicyclo[2.2.2]octane, and
2-(2-pentenyl)-2-azabicyclo[2.2.2]octane.

*Example 2.—3-allyl-3-azabicyclo[3.2.2]nonane hydrochloride*

A solution of 3 - allyl - 3 - azabicyclo[3.2.2]nonane in about 1 l. of absolute ether was acidified with ethanolic hydrogen chloride, giving 50.75 g. (95.5%) of 3-allyl-3-azabicyclo[3.2.2]nonane hydrochloride, M.P. 243° C. A 5 g. sample was recrystallized from 30 ml. of isopropyl alcohol, filtered while hot and cooled, giving 3.23 g. of 3 - allyl-3-azabicyclo[3.2.2]nonane hydrochloride, M.P. 242.5° C.

*Analysis.*—Calcd. for $C_{11}H_{20}ClN$: C, 65.49; H, 9.99; Cl, 17.58; N, 6.94. Found: C, 65.86; H, 9.84; Cl, 17.57; N, 6.72.

Following the procedure of Example 2 and substituting 2-allyl-2-azabicyclo[2.2.2]octane in place of 3-allyl-3-azabicyclo[3.2.2]nonane, there can be obtained 2-allyl-2-azabicyclo[2.2.2]octane hydrochloride.

In like manner, employing any of the free amino compounds of Formula I and the appropriate acid, there can be obtained the corresponding acid addition salts. Illustratively, using procedures analogous to those described above, the amines of Example 1 can be converted to their corresponding acid addition salts with hydrochloric, hydrobromic, sulfric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids and the like.

I claim:

1. A compound of the formula:

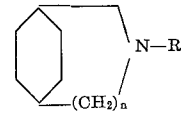

wherein $n$ is 0 or 1 and R is a lower 2-alkenyl radical of 3 to 5 carbon atoms, inclusive, and the pharmacologically acceptable acid addition salts thereof.

2. 3-allyl-3-azabicyclo[3.2.2]nonane, a compound of claim 1, wherein R is allyl and $n$ is 1.

3. 3-allyl-3-azabicyclo[3.2.2]nonane hydrochloride, a compound of claim 1, wherein R is allyl, $n$ is 1, and the pharmacologically acceptable acid addition salt is the hydrochloride.

References Cited

UNITED STATES PATENTS 3,135,740   6/1964   Brannock et al. _____ 260—239

OTHER REFERENCES

Brown et al.: I. & E. C. Product Research and Development, vol. 4, pages 40–47.

Karrer: Organic Chemistry (Elsevier Publishing Company, New York, 1946), pages 74 and 75.

ALEX MAZEL, *Primary Examiner.*

ALTON D. ROLLINS, *Examiner.*